United States Patent [19]

Golz

[11] Patent Number: 4,930,051

[45] Date of Patent: May 29, 1990

[54] HEADLAMP WITH SLOPED LENS INCLUDING BEAM-SPREADING FLUTES

[75] Inventor: Thomas M. Golz, Willoughby Hills, Ohio

[73] Assignee: General Electric Company, Schenectady, N.Y.

[21] Appl. No.: 334,629

[22] Filed: Apr. 7, 1989

[51] Int. Cl.[5] .................................... B60Q 1/02

[52] U.S. Cl. .................................... 362/61; 362/309; 362/336; 362/338

[58] Field of Search ................. 362/61, 309, 336, 338, 362/326, 308

[56] References Cited

U.S. PATENT DOCUMENTS

| | | | |
|---|---|---|---|
| 1,041,329 | 10/1912 | Mygatt | 362/338 X |
| 1,955,603 | 4/1934 | Lamblin-Parent | 362/309 X |
| 2,568,494 | 9/1951 | Geissbuhler | 362/61 X |
| 3,431,449 | 3/1969 | Hundley | 362/309 X |
| 4,249,232 | 2/1981 | Dick | 362/61 |
| 4,446,511 | 5/1984 | Sands | 362/61 X |

*Primary Examiner*—Ira S. Lazarus
*Assistant Examiner*—Sue Hagarman
*Attorney, Agent, or Firm*—John P. McMahon; Stanley C. Corwin; Fred Jacob

[57] ABSTRACT

This headlamp for a motor vehicle comprises a lens that has a front surface that slopes backwardly from bottom to top of the lens. In localized regions of the lens, there are spread flutes, each comprising alternating ridges and grooves on the back surface of the lens. The individual ridges extend in a direction between the top and bottom of the lens and are characterized by having the form of a segment of an inverted, base-up cone. The individual grooves extend in a direction between the top and bottom of the lens and are characterized by having the form of a segment of an upright, base-down cone. The coniform configuration of the individual ridges and grooves serves to lift the edges of the light beam passing therethrough and thereby compensate for the tendency of the beam to droop at its edges as a result of the backward slope of the front surface of the lens.

28 Claims, 6 Drawing Sheets

Fig. 3
(PRIOR ART)
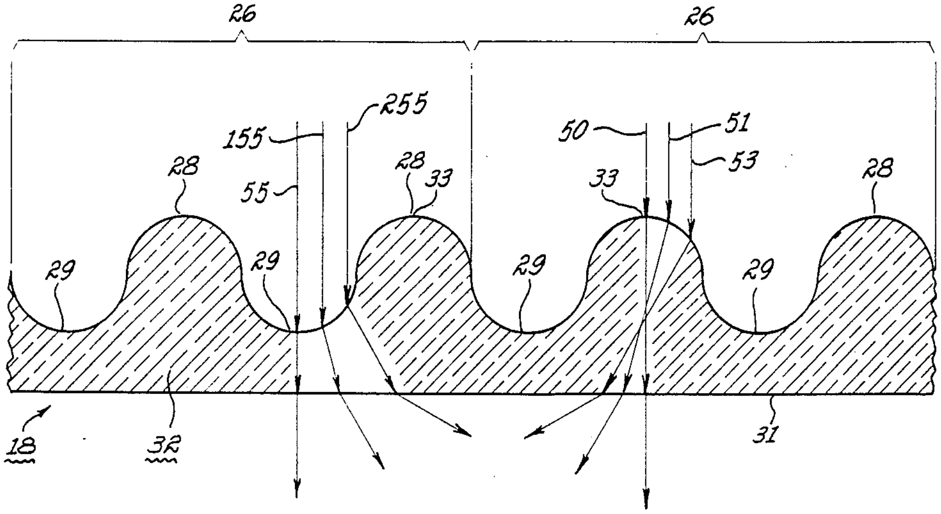
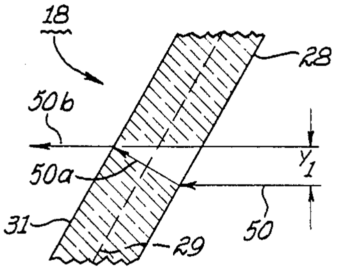
Fig. 4
(PRIOR ART)
Fig. 5
(PRIOR ART)
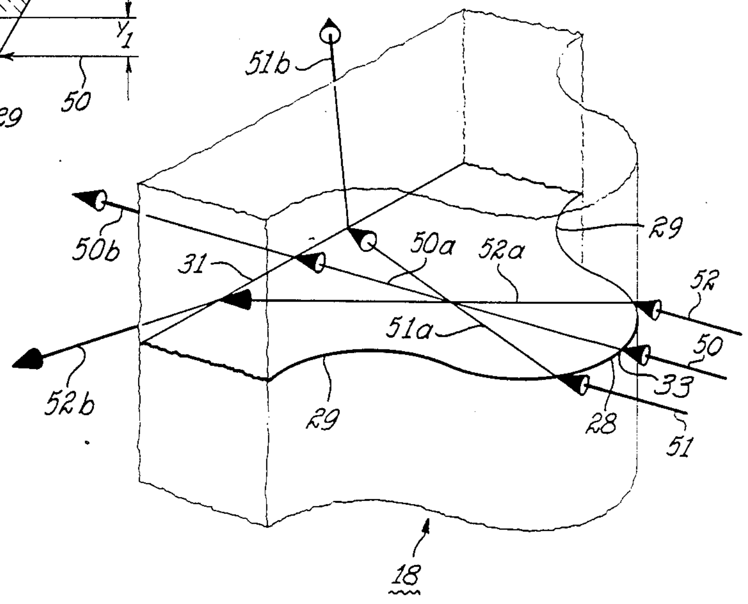

Fig. 6
(PRIOR ART)
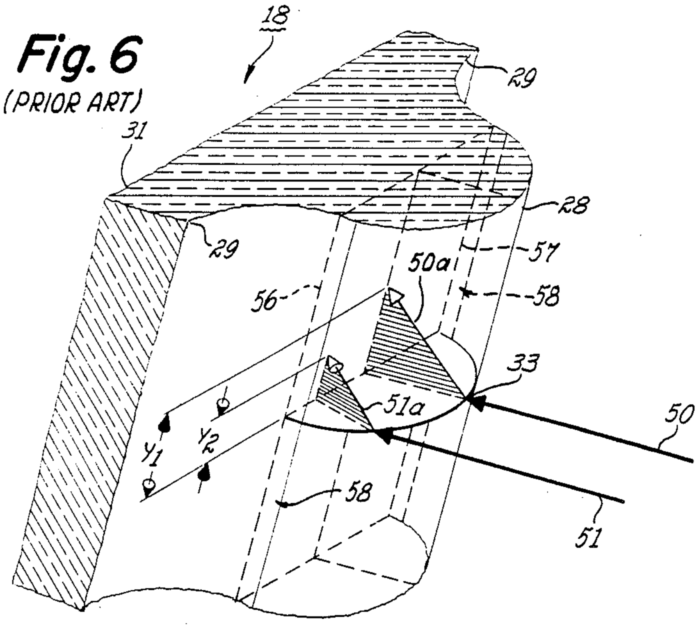
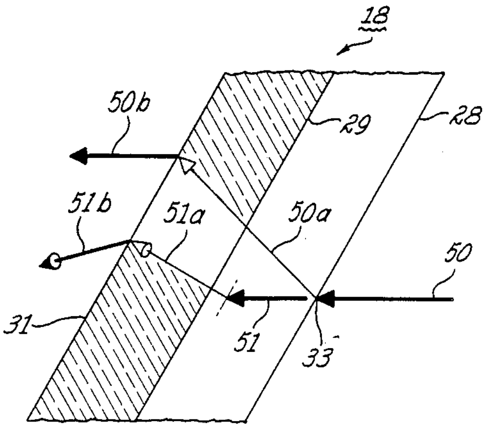
Fig. 7
(PRIOR ART)

HEADLAMP WITH SLOPED LENS INCLUDING BEAM-SPREADING FLUTES

This invention relates to a headlamp for motor vehicles and, more particularly, to a headlamp having a lens that includes spread flutes, each comprising one or more ridges and grooves on the back surface of the lens, for spreading out the beam developed by the headlamp.

BACKGROUND

A conventional headlamp lens is divided into many small prescription regions, or flutes. Certain of these flutes, referred to as spread flutes, are used for spreading out the headlamp beam. Such spread flutes have been used to provide foreground coverage of light to areas as far as 25 degrees to the side of the longitudinal axis of the vehicle. These spread flutes have typically included on their back surfaces alternating ridges and grooves, each extending vertically and each having the shape of a segment of a cylinder that is of uniform transverse cross-section at all points along its own central longitudinal axis. This uniform transverse cross-section may be circular, elliptical, sinusoidal, or any other shape, depending upon the light distribution desired from the ridge or groove. Flutes including such ridges and grooves of uniform transverse cross section are referred to herein as standard spread flutes.

While such headlamps provide a satisfactory pattern of light for those applications where the front of the lens is substantially vertical, a certain problem arises in those applications where the front of the lens is sloped back. More specifically, when the lens with the standard spread flutes is sloped back, the edges of the spread-out light beam emerging from such a flute droop, while the center of the light beam remains unaffected. Simply put, the standard spread flutes, when the lens is sloped back, do not spread the light as much, and the lost component ends up as down aim, or droop. (The term "sloped-back", as used herein, denotes that the bottom region of the lens is positioned ahead of the top region, considered in the direction of normal forward motion of the vehicle.)

The above-described problem is becoming increasingly more significant as car designers strive to improve the air flow over the front end of the car by specifying that the headlamp lenses be sloped back to match the front end curves of the car. The greater the slope, the more the beam tends to droop at its edges. Another factor sometimes present that can interfere with properly spreading the beam is the presence of a substantial rake angle in the orientation of the headlamp lens.

OBJECTS

An object of my invention is to configure the spread flutes of a fluted headlamp lens in such a manner that, even though the lens is sloped back to provide the above-described streamlining effect, the spread flutes are still capable of spreading the light output into the desired regions at the side of the forward pathway of the vehicle.

Another object is to achieve the immediately-preceding object by providing spread flutes that are capable of achieving the desired spread of the headlamp beam without allowing the edges of the beam emerging from a flute to droop objectionably as a result of slope-back of the lens.

Another object is to configure the ridges and grooves of the spread flutes so that the flutes can perform in accordance with the above objects despite the presence of one or more of the following: (i) orientation of the lens so that a substantial rake angle is present, (ii) a bias in the location of the beam center, or (iii) substantially any desired cross-sectional shape in a horizontal plane which may be chosen for a ridge or groove to give the desired light distribution across the width of the ridge or groove.

Still another object is to configure the ridges and grooves of the spread flutes so that the flutes can perform in accordance with the first two objects set forth above despite the presence of a curvature on the front surface of the lens.

Still another object is to provide a sloped-back lens with a beam-spreading flute of non-standard configuration capable of preventing objectionable droop at the edges of the beam through the flute and also capable of producing the same light distribution along the width of said beam in any horizontal plane through the flute.

SUMMARY

In carrying out the invention in one form, I provide a headlamp for a motor vehicle comprising an envelope for enclosing a light source, the envelope comprising a lens and a reflector for reflecting light rays from the source through the lens. The lens has a front surface that is normally sloped backwardly so that its bottom region is positioned forwardly of its top region, considered in the direction of normal forward motion of the vehicle. The back surface of the lens includes in a localized zone of the lens a plurality of side-by-side ridges, each having a summit as viewed in horizontal planes through the ridge. Each summit extends lengthwise of its associated ridge along a ridge reference line, and the ridge reference lines extend generally parallel to said front surface and in a direction between said top and bottom regions. The ridges are individually characterized by having generally the form of a segment of an inverted base-up cone. Also included in the back surface of the lens in said localized zone are concave grooves alternating in position with said ridges. Each groove has a nadir as viewed in horizontal planes through the groove, and the nadir extends lengthwise of the groove along a groove reference line. The individual grooves are characterized by having generally the form of a segment of an upright, base-down cone and by having their groove reference lines extending substantially parallel to the ridge reference line of a juxtaposed ridge.

BRIEF DESCRIPTION OF FIGURES

For a better understanding of the invention, reference may be had to the following description taken in conjunction with the accompanying drawings, wherein:

FIG. 3 is an enlarged view of a portion of the headlamp lens present in the headlamp of FIG. 2.

FIG. 4 is a sectional view in a vertical plane of a portion of a prior art sloped-back headlamp lens having a standard flute. This section is taken through the summit of one of the ridges forming a part of the flute.

FIG. 5 is a perspective view of a single ridge forming a part of one of the prior art flutes depicted in FIG. 3.

FIG. 6 is a perspective view of the ridge of FIG. 4 taken from the back side of the lens. The top of the ridge is shown tilted downwardly toward the viewer.

FIG. 7 is a sectional view similar to FIG. 4 except taken at a lateral edge of the ridge.

DETAILED DESCRIPTION OF EMBODIMENTS

Figure 1:
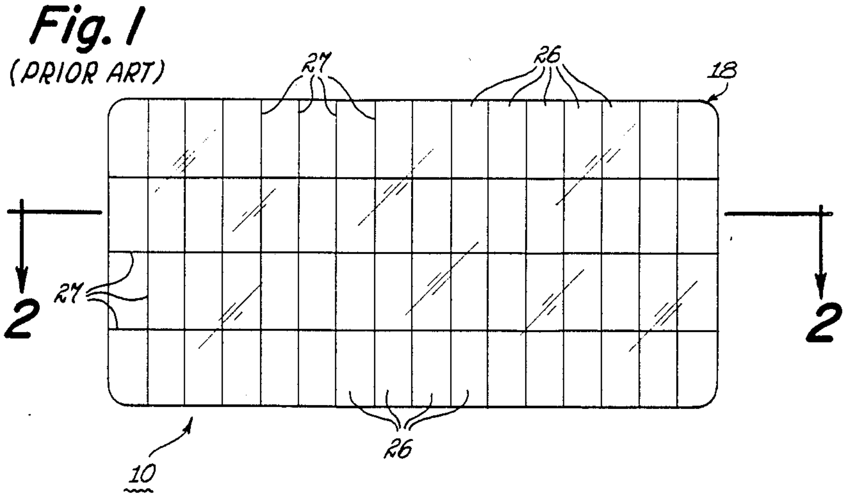
Fig. 1 (PRIOR ART)
FIG. 1 is a front-end view of a prior art headlamp, looking toward the lens of the headlamp.
Figure 2:
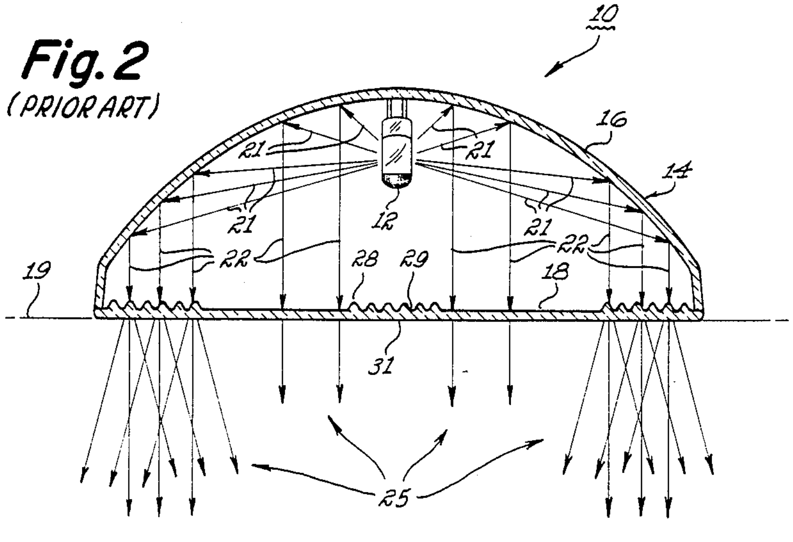
Fig. 2 (PRIOR ART)
FIG. 2 is a sectional view of the headlamp of FIG. 1 taken along the line 2—2 of FIG. 1.

Referring now to FIGS. 1 and 2, there is shown a prior art headlamp 10 comprising a light source 12 and an envelope 14 enclosing the light source. The envelope 14 comprises a reflector 16 of approximately paraboloidal configuration and a lens 18 of transparent material suitably fixed to the reflector 16 at the front end of the reflector. In the illustrated prior art headlamp, the lens 18 is located in a vertical plane 19 substantially perpendicular to the longitudinal axis of the vehicle. A typical light source 12 for the headlamp is a halogen tungsten incandescent bulb that comprises a filament located at or near the focal point of the approximately paraboloidal reflector. Other typical light sources are bare filaments and arc discharge lamps. Any of these sources is usable in the headlamp of my invention.

When the headlamp is turned on or energized, a large percentage of the light rays emitted by the incandescent filament are directed from the filament toward the reflector 16 and are reflected from the reflector as approximately parallel rays normal to the plane 19 of the lens or, if desired, at some intentional bias. In FIG. 2, typical light rays emitted by the filament are shown at 21, and typical rays reflected from the reflector 16 are shown at 22. Because of the approximately paraboloidal configuration of the reflector and the orientation of the source, the rays 22 follow substantially parallel, substantially horizontal paths, except for certain intentional bias as associated with glare or draft edge reduction.

The rays 22 pass through the transparent lens 18 including its front surface 31 and together form a beam 25. As shown in FIG. 1, the lens is divided into a large number of prescription regions 26 that join along draft edges 27 forming a grid 27 in the lens material on the back surface of the lens. (A typical prescription region is about ¼ inch by ⅝ inch.) Each of these prescription regions 26 (also referred to herein as flutes) is required to aim the light passing therethrough in accordance with the requirements of a predetermined specification. For spreading out the beam in accordance with such requirements, certain of the prescription regions (26), referred to as spread flutes, each include on the back surface of the lens alternating ridges 28 and grooves 29, each extending vertically. In the enlarged sectional view of FIG. 3, two spread flutes 26, each of typical form, are depicted. Each depicted spread flute 26 comprises two ridges 28 and two grooves 29 on the back surface of the flute. In a prior art headlamp, such as depicted in FIG. 3, each of the ridges 28 and each of the grooves 29 has a surface configuration in the shape of a segment of a cylinder having a vertical axis.

Rays (such as 50) that strike the ridges 28 at incident angles of about 0 degrees pass through the lens without substantial diversion. This occurs at the summit 33, or peak, of the ridge. But as the sloping side of the ridge is approached, this incident angle increases and the degree of diversion increases, as illustrated by the arrows of FIG. 3 depicting incident rays 51 and 53 and the refracted rays resulting therefrom. Similarly, rays (such as 55) that strike the groove 29 at or near the nadir, or center, of the groove pass through the lens without substantial diversion, but as the sloping side of the groove is approached, the incident angle again increases and the degree of diversion increases, as indicated by the rays 155 and 255.

In the prior art lens of FIGS. 1–3, the ridges 28 each typically have the configuration of a segment of a cylinder. Each ridge has a vertically-extending longitudinal axis coinciding with the longitudinal axis of the cylinder, and the ridge is of the same cross-sectional area at any horizontal plane along the length of this axis. Similarly, each groove 29 has the configuration of a segment of cylinder with the longitudinal axis of the groove coinciding with the central longitudinal axis of the cylinder and has the same cross-sectional area at any horizontal plane along the length of its longitudinal axis.

In view of this cylinder-segment configuration of the ridges and grooves, these components in any prescription region will distribute the incident light in substantially the same manner at the location of any horizontal sectional plane extending through the prescription region. This assumes that the rays of incident light impinge upon the ridges and grooves in substantially parallel horizontal paths, which is a reasonable assumption with the typical small prescription region and a substantially paraboloidal reflector. It also assumes that the lens is disposed in a vertical plane (19).

In the above discussion of the prior art headlamps, the front surface of the lens has been treated as being planar. In some cases, these front surfaces have had a slight curvature, e.g., that resulting from a 50-inch radius of curvature. The cylindrical ridges and grooves used for such lenses have typically had straight axes, but in some cases, they have had a slight curvature matching the slight curvature of the front of these lenses. The slight curvature of these axes and the effects of this slight curvature are so small as to be insignificant with respect to the discussion herein of the standard spread flutes.

As pointed out hereinabove under BACKGROUND, it is sometimes required that the lens, instead of being disposed in a vertical plane, be sloped back, i.e., be sloped so that its lower region is positioned forwardly of its upper region, considered in the direction of normal forward motion of the car. FIG. 4 is a vertical sectional view of a portion of such a sloped-back lens. It has been customary when using such a sloped-back lens to use the same uniform transverse cross-section ridges and grooves as described in connection with FIGS. 1-3, except with the longitudinal axes of the ridges and grooves sloped back at substantially the same angle as the lens itself.

A significant problem arises when the abovedescribed sloped-back lens design is used. More specifically, with ridges and grooves of this configuration, the far ends, or edges, of the spread-out light beam through a flute droop while the center remains unaffected. Accordingly, with a sloped-back lens, the ridges and grooves do not spread the light as much as they do in the above-described prior art design, and the lost component ends up as down-aim, or droop.

Figure 8:
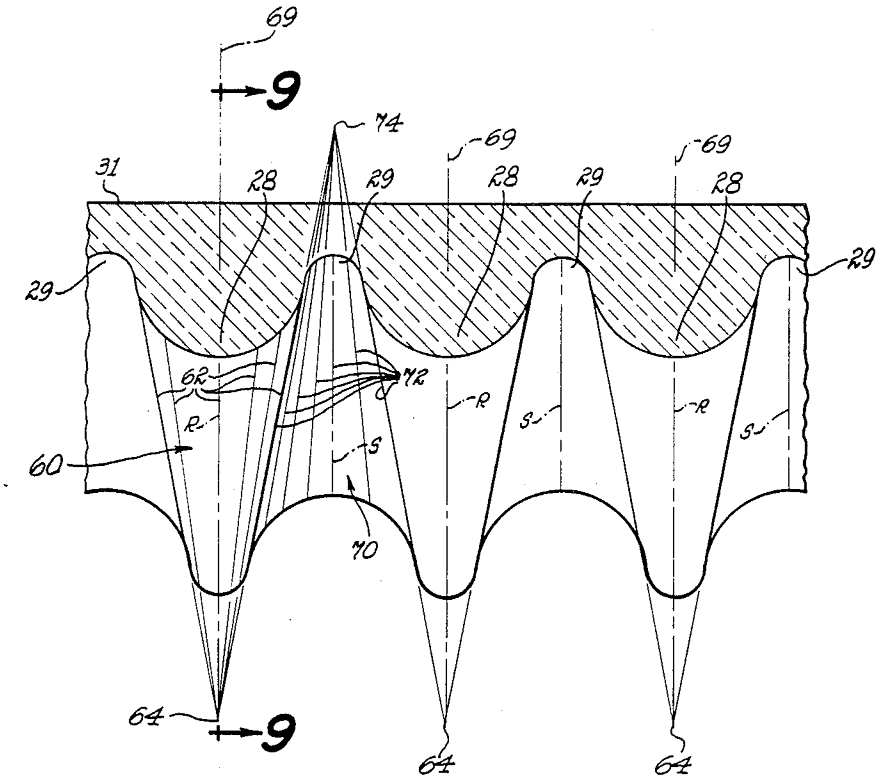
FIG. 8 is a perspective view, partly in section, of a localized portion of a headlamp lens embodying one form of my invention. A flute comprising a plurality of ridges and grooves on the back surface of the lens is depicted.

I am able to reduce or, if desired, to altogether prevent or even overcorrect for such droop throughout the whole spread of the beam by using, when the lens is sloped back, a very different configuration of the spread flutes from that of the above-described standard spread flutes. More specifically, in a typical flute or prescription region such as shown in FIG. 8, I shape each of the ridges (28) so that it has the form of a segment of an inverted, base-up cone shown with an arbitrary central longitudinal axis 69 of the ridge, and I shape each of the grooves (29) so that it has the form of a segment of an upright base-down cone shown with an arbitrary central longitudinal axis 79 of the groove. Along the longitudinal axis 69 of each ridge (28), the cross-section of each ridge gradually decreases, proceeding from the upper edge of the prescription region to its lower edge. Along the longitudinal axis 79 of each groove (29), the cross-section of each groove gradually increases, proceeding from the upper edge of the prescription region to its lower edge. These relationships are discussed in more detail hereinafter and with specific reference to FIGS. 8-15.

The following discussion of the light paths through various headlamp lenses should make clearer (1) why the beam droops at its outer edges when ridges of uniform transverse cross-section along their length are employed with a sloped-back lens and (2) why my coniform ridges are able to reduce this edge drooping effect. Referring first to FIG. 5, there is shown in perspective a standard cylindrical-segment ridge located at the back side of a vertically-disposed lens, with parallel beams of light 50, 51 and 52 disposed in a horizontal plane impinging against the ridge. The central ray 50 passes through the lens without substantial deviation, passing through the lens as a refracted ray 50*a*, and emerging from the lens as an emerging ray 50*b*. The two rays 51 and 52 at opposite sides of the ridge enter the ridge as refracted rays 51*a* and 52*a* and then pass through the glass-to-air 31 interface at the front of the lens as emerging rays 51*b* and 52*b*, respectively. These latter rays are disposed in the same horizontal plane as the emerging central ray 50*b*, and all the emerging rays are disposed in the same horizontal plane as the entering rays 50, 51 and 52.

Referring next to FIG. 4, the lens 18 is shown sloped back and in section, and the central ray 50 is shown in the plane of the paper and impinging against the back surface of the ridge at its summit. Because the front surface of the lens and the rear surface of the summit of the ridge are parallel, the exiting light ray 50*b* is parallel to the entering light ray 50 but is vertically displaced therefrom by an amount directly related to the thickness of the glass lens. Refraction of ray 50 at each interface is in the plane of the paper and all the rays 50, 50*a* and 50*b* are in such plane.

Referring next to FIG. 6, the sloped-back ridge of FIG. 4 is viewed from the back side of the lens. The central ray 50, in passing through the glass as refracted ray 51*a*, is shown displaced vertically by a slope component $Y_1$. Ray 51 at the side of the ridge 28 passes through the air-to-glass interface 31 as a ray 51*a*. This ray 51*a* is in a plane of refraction that is defined by the incident ray 51 and the normal to the surface of the ridge at the point of incidence for the ray 51. Ray 51*a* has a horizontal component and also a vertical component $Y_2$. Because the refraction is divided between two components, the vertical component $Y_2$ is not as great as the $Y_1$ component, and the ray 51*a* accordingly strikes the front glass-to-air interface 31 at a lower level and a lower vertical angle than the central ray 50*a*. Referring to FIG. 7, the different incidence angle and the differently oriented plane of refraction at the front glass-to-air interface for ray 51*a*, as compared to those for the central ray 50*a*, result in a downward angle being present in the path of the emerging ray 51*b*, whereas the emerging central ray 50*b* stays horizontal Accordingly, at a given horizontal distance forwardly of the lens, the ray 51*b* is aimed at a substantially lower point than the central ray 50*b*. This produces the droop effect at the edge of the beam that the present invention serves to correct.

In the standard sloped-back cylindrical flute, each ridge 28, as viewed from the back of the lens as in FIG. 6, has its lateral edges 56 and 57 extending from top to bottom of the flute via vertical paths. If the surface of the ridge is divided into imaginary narrow strips such as 58 running parallel to edges 56 and 57, it will be apparent that each strip will extend parallel to the longitudinal axis of the cylinder forming the ridge, with no end-to-end slope in the strips differing from the slope of such longitudinal axis. By imparting to these strips (58) that form the outer surface of the ridge, an end-to-end slope different from the slope of the longitudinal axis of the solid forming the ridge, I can change the effective angle of incidence of a ray such as 51, the orientation of the refraction plane in which the refracted ray 51*a* is disposed, and therefore the vertical component $Y_2$ of the refracted ray 51*a*. A suitable change in this end-to-end slope of the ridge surface will result in the emerging ray 51*b* being disposed horizontally or at any other desired vertical angle. If the end-to-end slope at several locations across the face of the ridge (in this same horizontal plane) are similarly modified, the emerging ray resulting from an incident ray parallel to and at the same level as the central ray 50 and impinging at any point across the ridge face can be rendered horizontal if that is desired. The result can be a substantially coplanar and horizontal disposition of these emerging rays.

It has been found that the surface tangents defining these end-to-end slopes at a single horizontal plane can be extended and merged to form the surface of a segment of an inverted, base-up cone. It was further found that the resulting distribution of surface areas and angles of this cone at any horizontal plane (within a reasonable range along the flute with a nearly flat front lens surface 31) gave the same spatial and angular distribution of light rays as was given at the original plane for which the slopes were established. As the number of strips 58 is increased, a smooth cone segment can be obtained. Such a cone is illustrated at 60 in FIG. 8, with these tangents depicted as convergent straight lines 62 defining the conical ridge surface and intersecting at a vertex 64. Along any one of the convergent surface lines 62, all normals to the ridge surface are parallel. The coniform segment (or ridge) is indicated by 65 (or 28) in FIGS. 8–10.

Figure 10:
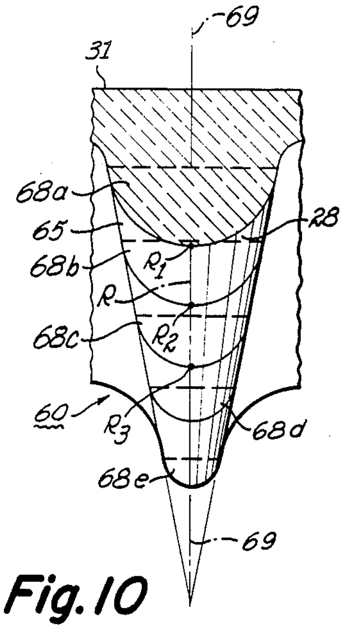
FIG. 10 is a perspective view of a single ridge present in one of the flutes depicted in FIG. 8.

Referring to FIG. 10, another way of describing the coniform segment 65 (or ridge 28) is that at any horizontal plane through the coniform segment, the segment has the same cross-sectional configuration, but the cross-sections (designated **68*a*–68*e*) at these horizontal planes are merely scaled down, proceeding downwardly along the longitudinal axis 69** of the segment (or ridge).

Another significant property of the coniform ridges is their orientation with respect to the front surface 31 of the lens and with respect to adjacent ridges of the same flute. This orientation can best be described by referring to a ridge reference line R for each ridge. This reference line (depicted in dot-dash form in FIGS. 8 and 10) is defined by the summit of the ridge as viewed in horizontal planes through the ridge. If these summit points (e.g., $R_1$, $R_2$, $R_3$ of FIG. 10) are connected along the length of the ridge, the ridge reference line R is established. The cone defining the surface of the ridge is so oriented that this ridge reference line R extends substantially parallel to the front surface 31 of the lens, and the ridge reference lines of side-by-side ridges in a flute extend parallel to each other. Ideally, if the center of the beam is to be aimed exactly parallel to the vehicle longitudinal axis and at the horizon, the ridge reference line will be oriented precisely parallel to the front surface of the lens; but certain slight deviations in beam aim from the above condition are usually intentionally incorporated, and to compensate for these slight deviations, I will usually orient the ridge reference line R a small amount (e.g., a few degrees) out of Parallel with the front surface of the lens.

Figure 11:
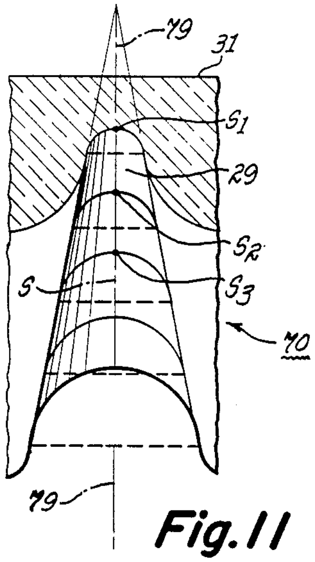
FIG. 11 is a perspective view of a single groove present in one of the flutes of FIG. 8.

While the above explanation has referred primarily to the ridges 28, the juxtaposed grooves 29 play an equally important role in developing the desired pattern of light output from each prescription region. The surfaces of these grooves 29 direct the incident light rays through the lens in essentially the same manner as the surfaces of the juxtaposed ridges 28. By making each groove of the same conical form as the juxtaposed ridge, except configuring it as a segment of a mirrored upright cone instead of an inverted cone, I am able to produce the same coplanar and horizontal disposition of the emerging light rays as described above in connection with the ridges. Such an upright cone is shown in FIG. 8 at 70. Surface tangents defining the end-to-end slope of the upright cone are depicted as straight lines 72, and these lines 72 intersect at a vertex 74. As shown in FIG. 11, horizontal cross-sections through a typical groove 29 taken at successively lower locations along the axis 79 of its cone have the same configuration, except scaled up in size.

Figure 9:
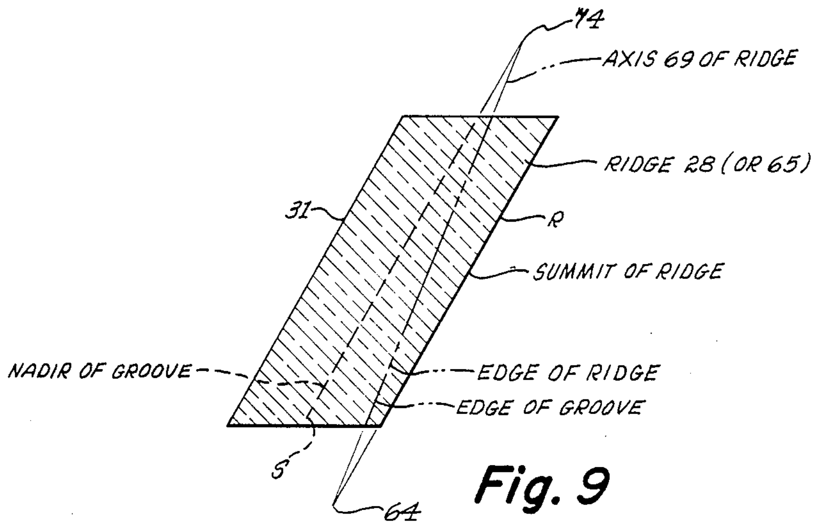
FIG. 9 is a sectional view of the lens of FIG. 8 taken in a transverse vertical plane that includes the line 9—9 of FIG. 8.

The coniform grooves 29 are oriented with respect to the front surface of the lens and with respect to each other in a manner corresponding to that described hereinabove for the ridges. More specifically, each groove may be thought of as having a groove reference line S (FIGS. 8 and 11) that is defined by the nadir of the groove as viewed in horizontal reference planes through the groove. If these nadir points (e.g., $S_1$, $S_2$, and $S_3$—FIG. 11) are connected along the length of the groove, the groove reference line S is established. The cone defining the surface of the groove is so oriented that this groove reference line extends substantially parallel to the front surface of the lens as seen in FIG. 9, and the groove references lines 8 of side-by-side grooves in a flute extend parallel to each other, as best seen in FIG. 8. In addition, the groove reference lines S extend parallel to the ridge reference lines R of juxtaposed ridges in a flute, as best seen in FIG. 8.

Figure 12A:
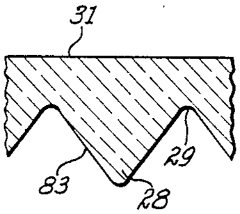
FIG. 12 includes two schematic horizontal sectional views (*a*) and (*b*), each depicting a modified form of the invention in which the ridges and grooves have a different configuration from that present in FIG. 8.
Figure 12B:
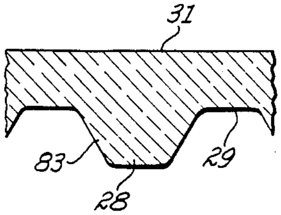

While the ridges and grooves depicted in FIG. 8 will form a generally sinusoidal curve in a horizontal reference plane through the middle of the flute, the invention is applicable to ridges and grooves forming (in that horizontal plane) curves of many other configurations as may be required to adjust distribution of light across the beam; e.g., parabolas, arcs, steps, or the curves 83 shown in FIGS. 12(*a*) and 12(*b*). Irrespective of this curve configuration, I still employ for the ridges 28 an inverted conical form in which horizontal cross-sections taken through the ridge at successively lower locations have the same configuration, except scaled down in size, as generally depicted in FIG. 10. Similarly, each groove 29 adjacent a ridge has the configuration of a segment of an upright, base-down cone in which horizontal cross-sections taken through the groove at successively lower locations have the same configuration, except scaled up in size, as generally depicted in FIG. 11. Normally, but not necessarily, the groove horizontal cross-section will be a mirror image of the horizontal cross-section of the juxtaposed ridge in the same flute.

Figure 13:
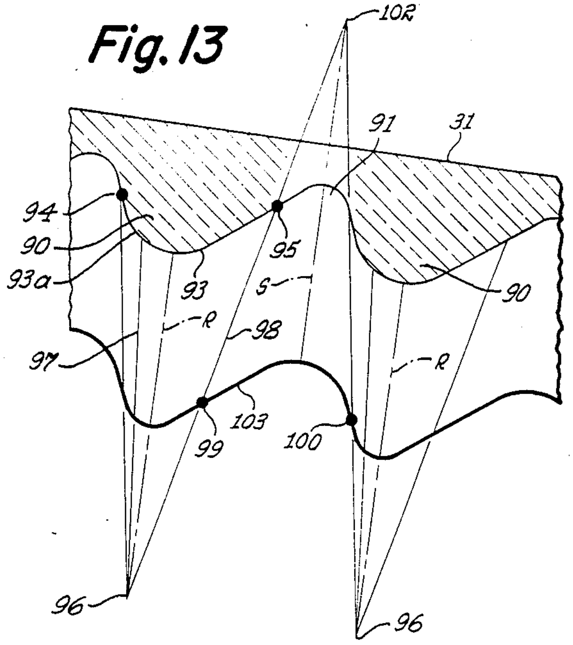
FIG. 13 is a perspective view, Partly in section, similar to that of FIG. 8 and illustrating another form of my invention. This view is taken from the back of the lens and depict a flute with ridges and grooves tilted or canted to accommodate a rake angle in the disposition of the lens.

While in FIGS. 8–12, each ridge has been depicted as having the same mirror-image shape and size on opposite sides of its summit, this symmetrical relationship is only exemplary and is not always appropriate. For example, FIG. 13 illustrates two ridges 90 of asymmetrical configuration in horizontal cross-section, and these ridges are located on opposite sides of a groove 91 of asymmetrical configuration in horizontal cross-section. These ridges 90, like those previously described hereinabove, are of inverted conical form. The inverted cone defining the left-hand ridge 90 has a base, a portion of which is defined by the portion **93*a* of curve 93 located between points 94 and 95, and has a vertex defined by the point 96. The outer surface of this ridge 90 is defined by straight lines (such as R, 97 and 98) connecting the curve portion 93*a* and the vertex point 96. Similarly, the groove 91 is in the form of a segment of a cone having a base, a portion of which is defined by the portion of curve 103 between points 99 and 100 at the bottom of the flute and a vertex defined by a point 102 at the top of the flute. Ridges and grooves of such configuration are called for in certain applications requiring non-uniform distribution or on a lens with a rake angle, as will soon be discussed in connection with FIGS. 14 and 15**.

In certain applications, it may be desirable or sufficient to only partially correct the droop at opposite edges of the beam through the sloped-back lens. In such cases, the ridges and the grooves will typically have a less pronounced taper than the taper required for complete correction of the droop.

It is noted that the greater the slope-back angle of the lens, as measured from a vertical plane at the front of the lens, the more pronounced will be the taper required of the ridges and grooves to fully correct the edge-droop of the beam.

Figure 14:
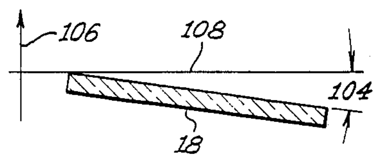
FIG. 14 is a sectional view taken in a horizontal plane of a lens having a substantial rake angle.

It is to be understood that this invention is applicable not only to a sloped-back lens that has a zero rake angle but also to one that has a substantial rake angle, as depicted at 104 in the horizontal cross-sectional view of FIG. 14, where the lens is depicted at 18, straight ahead is depicted by the arrow 106, and 108 designates a plane normal to the central longitudinal axis of the vehicle. The presence of this substantial rake angle (104) will influence the manner in which the rays passing through the glass-to-air interface 31 at the front of the lens are refracted, but this is compensated for by canting the ridge reference line R of each ridge and groove reference line S of each groove to the side of the lens. This canting to the side is illustrated in FIG. 13, where the canted ridge reference line R and canted groove reference line S are illustrated in dotted line form. The reference lines R and S are parallel to each other and substantially parallel to the front surface 31 of the lens. The amount of such canting is typically quite small (e.g., a few degrees for a typical rake angle), but this is sufficient to compensate for the additional droop and beam tilting of the beam otherwise resulting from the presence of the rake angle. The amount of such canting will vary directly with the magnitude of the rake angle. The direction of the cant, proceeding downwardly along the length of the ridge or groove, is toward a vertical plane containing the central longitudinal axis of the vehicle.

Figure 15:
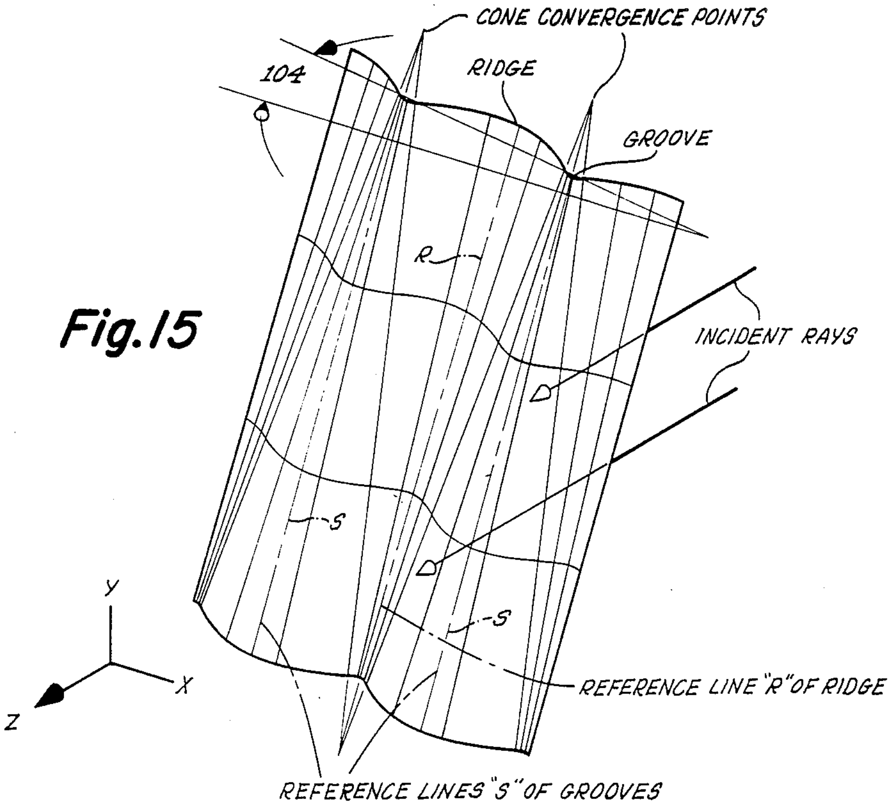
FIG. 15 is a computer-generated perspective view of a portion of the back surface of a lens embodying a modified form of the invention, as viewed from the front of the lens looking through it.

FIG. 15 is a computer-generated perspective view of a portion of the back surface of a lens, as viewed from the front of the lens looking through it. This figure shows the cones defining the ridges and grooves as provided with canted reference lines R and S to compensate for the Presence of a 30 degree slope and a 15 degree rake angle at 104. The direction of the cant is such that the reference lines of each ridge, in proceeding downwardly, will extend toward a vertical plane containing the longitudinal center line of the vehicle The forward direction of the vehicle is depicted by the arrow Z in the X, Y, Z coordinates shown at the bottom left-hand corner of FIG. 15.

Some sloped-back headlamp lenses also have a curved front surface to provide additional streamlining. This curving also influences the manner in which the rays passing through the glass-to-air interface at the front of the lens are refracted, but this too can be compensated for by appropriately curving the ridge reference lines R and the groove reference lines S of the spread flutes. If the front surface 31 of the lens curves toward the side of the vehicle as viewed in a horizontal cross-section through the headlamp, the ridges and grooves in this curved region of the lens are provided with curved reference lines R and S, respectively, that in proceeding downwardly extend toward a vertical plane containing the central longitudinal axis of the vehicle. To provide additional streamlining, the front surface of the lens may also be curved from top to bottom as viewed in a vertical plane through the headlamp. Ii this top-to-bottom curvature is present and is relatively large, then the reference lines R and S are provided with a corresponding curvature that compensates for the front surface curvature and renders each of these reference lines substantially uniformly spaced from the front surface of the lens along the reference line length. If the top-to-bottom curvature of the lens is only slight, then the reference lines R and S, which are generally parallel to the front surface, can still be essentially rectilinear since over the short height of a flute the spacing between the slightly curved front surface and such a reference line varies only slightly.

If the front surface of the lens is curved by relatively large amounts in both of the directions referred to in the immediately-preceding paragraph, the flute surfaces and references lines R and S are curved in both of the directions referred to in the immediately-preceding paragraph. In general, there will be less need to curve the flute surfaces laterally of the headlamp since the lateral dimension of each ridge or groove is small compared to its longitudinal dimension, and lateral front-surface curvature will be less demanding of compensation than a corresponding amount per unit of length of up-down front-surface curvature.

In arriving at the precise configuration and orientation of the ridges and grooves, the headlamp designer employing my invention first determines the horizontal cross-sectional configuration of the ridge needed to give the desired distribution of light across the beam therethrough. With the front surface 31 of the lens (e.g., rake, slope, etc.) and the index of refraction of the lens glass specified, he determines the path of the ray through the glass of the lens for the specified aim of one side of the spread beam. He then uses that in-glass ray and any reflector beam bias to find the resulting surface orientation on the back of the lens required to refract the light from the reflector exactly through that in-glass ray path. He then applies that surface orientation to the respective edge of the ridge configuration in order to determine a plane (extending transversely of horizontal) which directs light along the above path through the glass. He repeats this series of operations for several other Points in the same horizontal plane, including a point at the opposite edge of the ridge for the other side of the beam, and typically a point at the beam center. He thus defines a series of planes (extending transversely of the horizontal plane) which intersect to define the convergence point, or vertex, of the cone. In its simplest form, the cone can be specified by one curved line in space (representing a horizontal cross-section through the ridge) and one conic convergence point, or vertex. The same approach can be used to define the coniform surface of each groove; or, alternatively, the groove surface can be established simply by mirroring the ridge surface.

While the invention has been described hereinabove in connection with a backwardly sloping lens, it is to be understood that the invention in its broader aspects is also applicable to a forwardly sloping lens, i.e., one in which the lens slopes so that its top region is ahead of its bottom region, considered in the direction of normal forward vehicle motion. Such a forward slope can be useful in forward lighting for an airplane. Where such forward slope is present, the ridges and grooves on the back surface of the spread flute are reversed in configuration from that shown in the other figures. That is, the individual ridges are in the form of a segment of an upright, base-down cone, and the individual grooves are in the form of a segment of an inverted, base-up cone. Accordingly, the invention in its broader aspects can compensate for edge misaim of the beam resulting from any slope.

It is to be understood that the invention can also accommodate and compensate for the presence of any rake angle, or desired misaim, or bias, or distribution of light across the width of the flute.

While I have shown and described particular embodiments of my invention, it will be obvious to those skilled in the art that various changes and modifications may be made without departing from my invention in its broader aspects; and 1, therefore, intend herein to cover all such changes and modifications as fall within the true spirit and scope of my invention.

What I claim as new and desire to secure by Letters Patent of the United States is:

1. A headlamp for a motor vehicle comprising an envelope for enclosing a light source, the envelope comprising a lens and a reflector for reflecting light rays from said light source through said lens, said lens having:

(a) two regions that respectively are normally near the top and the bottom of said lens, (b) a front surface that is normally sloped backwardly so that said bottom region is normally positioned forwardly of the top region, considered in the direction of normal forward motion of the vehicle, (c) a back surface including in a localized zone of said lens side-by-side ridges, each having a summit as viewed in horizontal planes through the ridge, each summit extending lengthwise of the associated ridge along a ridge reference line, said ridge reference lines (i) extending generally parallel to said front surface and (ii) in a direction between said top and bottom regions, said ridges being individually characterized by having generally the form of a segment of an inverted, base-up cone, and (d) a concave groove in said back surface located between said ridges and having a nadir as viewed in horizontal planes through the groove, said nadir extending lengthwise of the groove along a groove reference line, said groove being characterized by having generally the form of a segment of an upright, base-down cone and by having said groove reference line extending substantially parallel to said ridge reference line of a juxtaposed ridge.

2. The headlamp of claim 1 in which:

(a) there is in said localized region an additional concave groove in the back surface of said lens, and said grooves and ridges are side-by-side and alternate in position, (b) the additional groove has a nadir as viewed in horizontal planes through the additional groove, said nadir extending lengthwise of the groove along an additional groove reference line, and (c) said additional groove being characterized by having generally the form of an upright, base-down cone and by having said additional groove reference line extending substantially parallel to the ridge reference line of a juxtaposed ridge.

3. A headlamp as defined in claim 1 and further characterized by:

(a) the individual ridges being of such a configuration that along substantially each straight line extending between the vertex of the ridge's cone and the base of said cone substantially all normals to the ridge surface are substantially parallel.

4. A headlamp as defined in claim 1 and further characterized by:

(a) the individual ridges being of such a configuration that along substantially each straight line extending between the vertex of the ridge's cone and the base of said cone substantially all normals to the ridge surface are substantially parallel, and (b) the groove being of such a configuration that along substantially each straight line extending between the vertex of the groove's cone and the base of said cone substantially all normals to the groove surface are substantially parallel.

5. A headlamp as defined in claim 1 and further characterized by the distribution of the light output from the lens through said localized zone being substantially the same along any horizontal section through said localized zone.

6. A headlamp as defined in claim 2 and further characterized by the distribution of the light output from the lens through said localized zone being substantially the same along any horizontal section through said localized zone.

7. A headlamp as defined in claim 1 and further characterized by the distribution of the light output from the lens through an individual ridge being substantially the same along any horizontal section through said individual ridge.

8. A headlamp as defined in claim 1 and further characterized by the distribution of the light output from the lens through said groove being substantially the same along any horizontal section through said groove.

9. A headlamp as defined in claim 2 and further characterized by the distribution of the light output from the lens through an individual groove being substantially the same along any horizontal section through said individual groove.

10. The headlamp of claim 1 in which the ridges are individually characterized by having at successively lower locations horizontal cross-sections of the same configuration, except scaled down.

11. The headlamp of claim 1 in which said groove is characterized by having at successively lower locations horizontal cross-sections of the same configuration, except scaled up.

12. The headlamp of claim 10 in which said groove is characterized by having at successively lower locations horizontal cross-sections of the same configuration, except scaled up.

13. The headlamp of claim 2 in which:

(a) the ridges are individually characterized by having at successively lower locations horizontal cross-sections of the same configuration, except scaled down, and (b) the grooves are individually characterized by having at successively lower locations horizontal cross-sections of the same configuration, except scaled up.

14. The headlamp of claim 1 in which the coniform ridges are individually characterized by having an outer surface tapering to such an extent that rays from said reflector that are incident to an individual ridge and are disposed in a single horizontal plane produce emerging rays that exit the lens through its front surface in substantially a single horizontal plane.

15. The headlamp of claim 2 in which the coniform grooves are individually characterized by having a surface tapering to such an extent that rays from said reflector that are incident to an individual groove and are disposed in a single horizontal plane produce emerging rays that exit the lens through its front surface in substantially a single horizontal plane.

16. The headlamp of claim 1 in which:

(a) said lens is normally oriented at a substantial rake angle with respect to a vertical plane normal to the central longitudinal axis of the vehicle, and (b) the ridge reference lines of said ridges are canted so that in proceeding downwardly, they extend toward a vertical plane including said central longitudinal axis of the vehicle.

17. The headlamp of claim 2 in which:

(a) said lens is normally oriented at a substantial rake angle with respect to a vertical plane normal to the central longitudinal axis of the vehicle, and (b) the groove reference lines of said grooves are canted so that in proceeding downwardly, they extend toward a vertical plane including said central longitudinal axis of the vehicle.

18. A headlamp for a motor vehicle comprising an envelope for enclosing a light source, the envelope comprising a lens and a reflector for reflecting light rays from said light source through said lens, said lens having:

(a) two regions that respectively are normally near the top and the bottom of said lens, (b) a front surface that is normally sloped backwardly so that said bottom region is normally positioned forwardly of the top region, considered in the direction of normal forward motion of the vehicle, (c) a back surface including in a localized zone of said lens two side-by-side ridges, each having a summit as viewed in horizontal planes through the ridge, each summit extending lengthwise of the associated ridge along a ridge reference line, said ridge reference lines (i) extending in substantially uniformly spaced relationship to said front surface and (ii) in a direction between said top and bottom regions, said ridges being individually characterized by having generally the form of a segment of an inverted, base-up cone, and (d) a concave groove in said back surface located between said ridges and having a nadir as viewed in horizontal planes through the groove, said nadir extending lengthwise of the groove along a groove reference line, said groove being characterized by having generally the form of a segment of an upright, base-down cone and by having said groove reference line uniformly spaced from said ridge reference line of a juxtaposed ridge, as viewed in horizontal planes through said localized zone.

19. A headlamp as defined in claim 18 in which:

(a) said lens has a front surface that curves from top to bottom of the lens as viewed in vertical cross-section through the headlamp, said localized zone being located in the zone of the curved front surface, (b) said ridges and groove have their respective reference lines curved to compensate for the curvature of the front surface.

20. A headlamp as defined in claim 18 in which:

(a) said lens has a front surface that curves toward the side of the vehicle as viewed in a horizontal cross-section through the headlamp, said localized zone being located in the zone of the curved front surface, and (b) the ridges and the groove have curved reference lines that in proceeding downwardly extend toward a vertical plane including the central longitudinal axis of the vehicle.

21. A headlamp as defined in claim 18 in which:

(a) said lens has a front surface that curves from top to bottom of the lens as viewed in vertical cross-section through the headlamp and also curves toward the side of the vehicle as viewed in horizontal cross-section through the headlamp, said localized zone being located in a zone of said lens where curving of the front surface in both directions is present, and (b) the ridges and groove have their respective reference lines curved to compensate for the curvature of the front surface.

22. A headlamp for a vehicle comprising a lens having:

(a) a front surface that is normally sloped backwardly so that its bottom is normally positioned forwardly of its top, considered in the direction of normal forward motion of the vehicle, and (b) a back surface including a ridge having a summit as viewed in horizontal planes through the ridge, the summit extending lengthwise of the ridge along a ridge reference line, said ridge reference line extending generally parallel to said front surface and in a direction between the top and bottom of said lens, said ridge having generally the form of a segment of an inverted, base-up cone.

23. A headlamp as defined in claim 22 in which said back surface further includes: a concave groove immediately adjacent said ridge having a nadir as viewed in horizontal planes through the groove, said nadir extending lengthwise of the groove along a groove reference line that extends generally parallel to said front surface and in a direction between the top and bottom of said lens, said groove being characterized by having generally the form of a segment of an upright, base-down cone and by having said groove reference line uniformly spaced from said ridge reference line.

24. An optical system comprising a lens that has a front surface that slopes in extending between the top and bottom of the lens, said lens including a spread flute for spreading the light transmitted therethrough from a source to a target located forwardly of the lens, said spread flute comprising on the back surface of said lens one or more ridges and grooves (i) each extending along its length in a direction between the top and bottom of the lens and (ii) each being of a coniform configuration effective to compensate for misaim of an edge of the beam transmitted through said lens toward said target by vertically displacing said edge.

25. The optical system of claim 24 in which said front surface slopes backwardly in proceeding from the bottom to the top of the lens and each of said ridges has the form of a segment of an inverted, base-up cone for lifting said beam edge.

26. The optical system of claim 25 in which each of said ridges is characterized by having at successively lower locations horizontal cross-sections of the same configuration, except scaled down.

27. The optical system of claim 25 in which each of said grooves has the form of a segment of an upright, base-down cone located immediately adjacent an inverted cone forming one of said ridges.

28. The optical system of claim 27 in which each of said grooves is characterized by having at successively lower locations horizontal cross-sections of the same configuration, except scaled up.

* * * * *